July 9, 1957 H. G. VESTERDAL ET AL 2,798,573
DEGASIFICATION OF NON-GASEOUS FLUIDS
Filed May 28, 1953

DE-AERATOR FOR GREASE OR OTHER PLASTIC, SEMI-FLUID OR FLUID PRODUCT

Hans G. Vesterdal
Arnold J. Morway    Inventors

By *L. F. Many* Attorney

United States Patent Office 2,798,573
Patented July 9, 1957

2,798,573

DEGASIFICATION OF NON-GASEOUS FLUIDS

Hans G. Vesterdal, Elizabeth, and Arnold J. Morway, Clarktownship, Union County, N. J., assignors to Esso Research and Engineering Company, a corporation of Delaware Application May 28, 1953, Serial No. 358,143

4 Claims. (Cl. 183—114)

The present invention relates to the degasification of non-gaseous fluids. More specifically, the invention is concerned with the degasification, particularly the de-aeration of liquids, emulsions, gels such as greases, and similar fluids to remove from these fluids gases dispersed and suspended therein. In brief compass, the invention pertains to the removal of dispersed and suspended gases, such as air, from fluids by compressing the gas-containing fluid followed by a sudden release of the pressure.

When preparing vegetable or mineral emulsions or gels in open vessels under agitation, air often enters these fluids to be dispersed and retained therein in suspension after completion of the mixing process. For example, in the preparation of grease in open kettles air is worked into the grease, giving the grease a more or less milky appearance which is undesirable. Also, the air finely dispersed in the grease detrimentally affects the storage stability of the grease. The air should, therefore, be removed as completely as possible. This has been done heretofore by spreading the grease in a thin layer and subjecting the same to a vacuum. This is a tedious and rather expensive process.

Similar conditions prevail in the food industry where milled or homogenized products, such as milk, peanut butter, etc., often contain air which has to be removed in order to prevent deterioration in storage.

Figure 1:
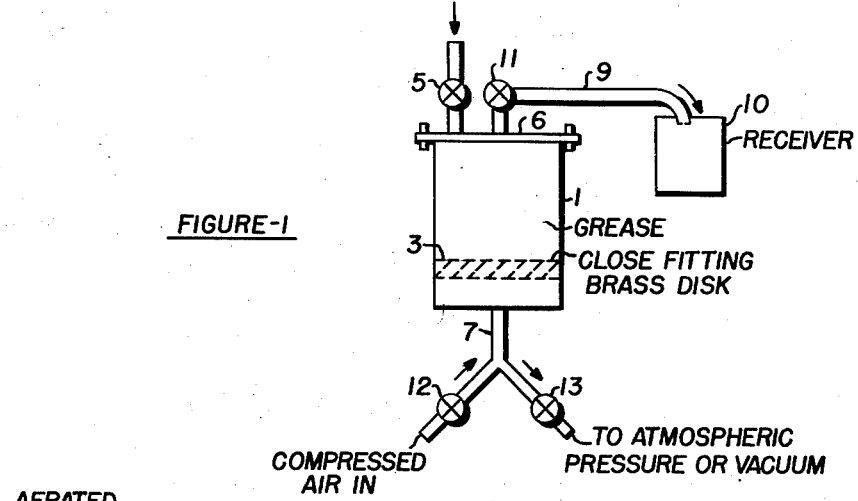
Figure 2:
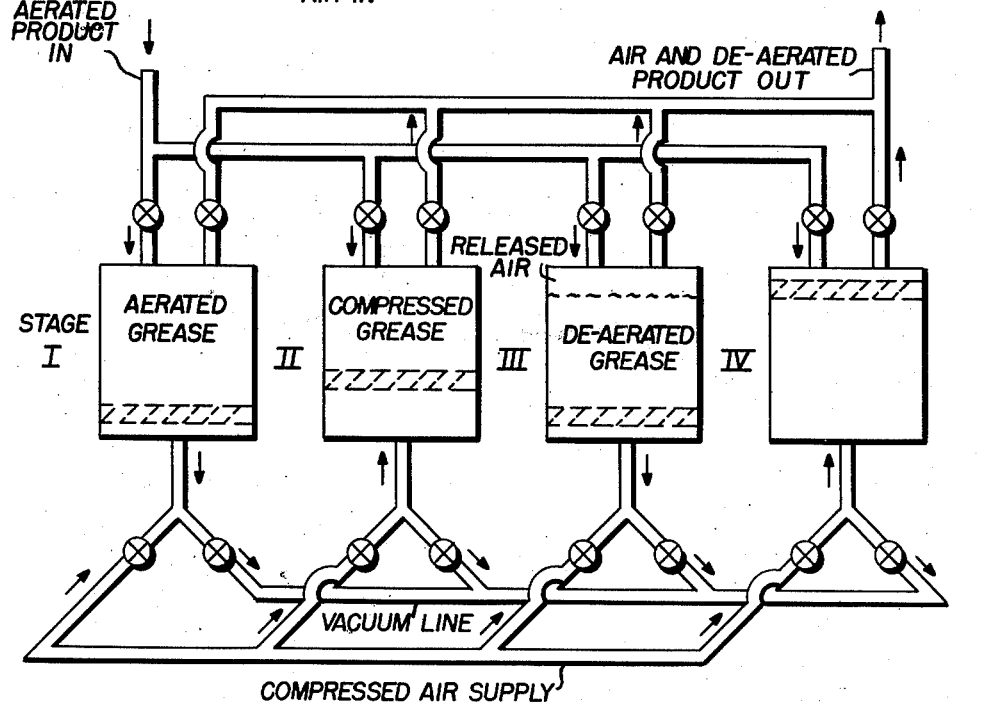

The present invention overcomes the aforementioned difficulties and affords various additional advantages as will appear from the following description of the invention wherein reference will be made to the accompanying drawing, wherein Figure 1 is a diagrammatical illustration of equipment adapted to carry out a specific embodiment of the invention; and Figure 2 illustrates schematically the practical application of equipment of the type shown in Figure 1.

In accordance with the present invention, gas-containing non-gaseous fluids, such as aerated greases, aerated mineral oils, aerated fatty oils, food stuffs, etc., are degasified or deaerated by compressing the fluids to pressures of at least about 50 p. s. i. g. and preferably about 50–200 p. s. i. g. and suddenly releasing the pressure at least to atmospheric pressure within less than about one minute and preferably practically instantaneously. If desired, several pressurizing and sudden depressurizing cycles may be employed to complete the degasification. It has been found that when so operating, the finely dispersed gas bubbles in the fluids expand and rise to the surface resulting in a separation of the gas from the fluid.

The process of the invention is most advantageously carried out in one or more cylinders provided with a movable piston for compressing the fluid and with valves suitable for the desired instantaneous pressure release. A system of this type is illustrated in Figures 1 and 2.

Referring now to Figure 1, the numeral 1 designates a closed cylindrical vessel provided with a closely fitting internal piston or movable metal disk 3. Aerated product and pressurizing fluid are admitted through lines 5 and 7, respectively. Gas and liquid outlet line 9 carries a pressure release valve 11.

In operation, the liquid to be degasified, for example a batch of aerated grease, is supplied to vessel 1 above piston 3 through line 5 or by removing cover plate 6. All valves with the exception of valve 12 in line 7 are closed and the pressurizing fluid, such as a hydraulic liquid or a gas, such as air, is pumped into vessel 1 through line 7 beneath piston 3. The fluid pressure pushes the piston 3 upwardly in vessel 1, thus compressing the aerated liquid above piston 3. When a pressure of, say, about 80–150 lbs. per sq. in. is reached the pressure is suddenly released by closing valve 12 and opening valve 13 in line 7, resulting in the separation of the air from the liquid. Thereafter, the piston 3 may be further raised by admitting additional pressurizing gas or liquid through line 7 with valve 11 open. The degasified liquid is forced in this manner through line 9 into a receiver 10.

In accordance with a specific modification of the invention, a plurality of cylinders of the type illustrated in Figure 1 may be employed and arranged in the manner of the cylinders of internal combustion engines as shown in Figure 2, which is self-explanatory. Timing gears and timed valves are provided to permit a sequence of operations in each cylinder, for instance in the fashion of a 4-stroke combustion engine. For example, the following sequence of operations may be followed in each cylinder:

Stage 1—Charge of gas-containing liquid
Stage 2—Compression of liquid
Stage 3—Pressure release
Stage 4—Discharge of degasified liquid Details of this arrangement will be apparent to those skilled in the art of engine design.

The invention will be further illustrated by the following specific examples.

Example I

A mineral oil grease containing 15% sodium soap of rapeseed oil was hardened to a worked penetration of 292 mm./10 by passing it 5 times through a Gaulin Homogenizer at 5000 p. s. i. g. The homogenized grease was thoroughly aerated as indicated by a milky appearance. Eighteen pounds of this aerated grease was charged to a 20 pound capacity cylinder of the type illustrated and compressed by applying an air pressure of 90 p. s. i. g. underneath the disk 3. On suddenly releasing the pressure, the grease was completely deaerated and almost transparent.

Example II

A lithium calcium grease was prepared having the formulation:

| | Wt. percent |
|---|---|
| Hydrofol acids 51 [1] | 10.0 |
| LiOH—$H_2O$ | 1.08 |
| Lime | 0.5 |
| Phenyl alpha-naphthylamine oxidation inhibitor | 0.5 |
| Mineral oil of 70 seconds Saybolt viscosity at 210° F | 87.92 |

[1] Hydrofol acids are hydrogenated fish oil acids corresponding in degree of saturation to commercial stearic acid.

On milling this greate in a Morehouse mill, the product was thoroughly aerated. The aerated grease was deaerated in the same manner as shown in Example I, except that a lower air pressure, 80 p. s. i. g., was applied. The deaerated grease was transparent in fairly thick layers.

Example III

A wheel bearing grease containing 14.4% sodium soap of Hydrofol glycerides which was strongly aerated in the course of manufacture was easily deaerated by using the procedure described in Example I.

The above description and exemplary operations have served to illustrate specific embodiments of the invention. It will be understood that the invention embraces such other variations and modifications as come within the spirit and scope thereof.

What is claimed is:

1. The process of degasifying non-gaseous fluids containing finely dispersed gas bubbles which comprises, supplying said fluids to a cylindrical vessel closed at one end with a piston, compressing said fluids in said vessel with said piston to a pressure of about 50 to 200 p. s. i. g., suddenly releasing said pressure at least to atmospheric pressure whereby gas is separated from said fluids within said vessel, and recovering the gasified fluids from said vessel.

2. The process of deaerating a grease containing finely dispersed air bubbles which comprises, supplying said aerated grease to a cylindrical vessel closed at one end with a piston, compressing said aerated grease with said piston to a pressure of about 80 to 150 p. s. i. g., suddenly releasing said pressure at least to atmospheric pressure whereby air is liberated from said grease, and separating the grease from the air so liberated.

3. The process of claim 1 which is carried out in a system of four vessels in each of which the stages of supplying, compressing, pressure-releasing and fluid recovery are conducted in the order mentioned, the timing of said stages being staggered over said vessels so as to obtain a substantially continuous flow of said degasified fluid from said system.

4. The process of claim 1 in which said non-gaseous fluid is a grease containing finely dispersed air bubbles.

References Cited in the file of this patent

UNITED STATES PATENTS

| | | |
|---|---|---|
| 2,250,925 | Babcock | July 29, 1941 |
| 2,257,945 | Fraser | Oct. 7, 1941 |
| 2,420,356 | Compa | May 13, 1947 |
| 2,649,165 | Stapler | Aug. 18, 1953 |
| 2,660,259 | Morehouse | Nov. 24, 1953 |
| 2,685,941 | Kassel | Aug. 10, 1954 |
| 2,695,878 | Entwistle | Nov. 30, 1954 |